United States Patent Office 3,073,985
Patented Jan. 15, 1963

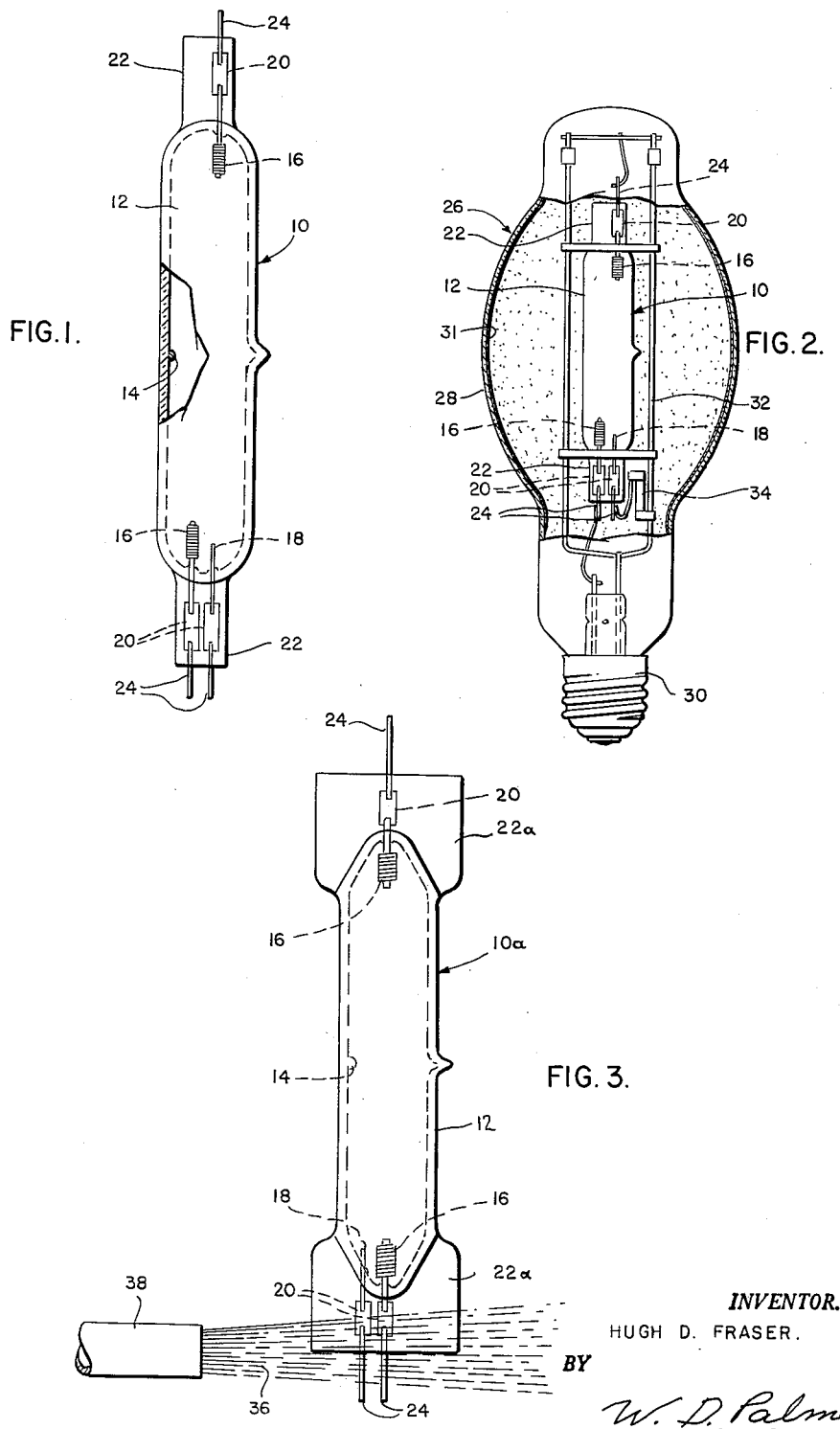

3,073,985
ARC TUBE AND METHOD
Hugh D. Fraser, West Caldwell, N.J., assignor to Westinghouse Electric Corporation, East Pittsburgh, Pa., a corporation of Pennsylvania
Filed Apr. 21, 1960, Ser. No. 23,821
9 Claims. (Cl. 313—266)

This invention relates to arc tubes and a method for improving arc tubes and, more particularly, to improved arc tubes and a method for processing fabricated high-pressure, mercury-vapor lamp arc tubes in order to improve the operating characteristics of lamps incorporating such tubes.

High-pressure, mercury-vapor lamps are used extensively for highway and other outdoor lighting and for illumination in high-bay factories. The use of such lamps is expanding rapidly and in recent years, these lamps have been color-corrected with respect to output through the use of selected phosphor materials and specially designed lamp envelope constructions, as described in U.S. Patent No. 2,748,303, dated May 29, 1956. In order to start these lamps, it is the general practice to utilize an auxiliary starting electrode which is positioned proximate one of the operating electrodes. When the lamp is first started, an initial discharge is created between the starting electrode and the operating electrode which is positioned proximate thereto. This ionizes the atmosphere within the arc tube to enable the operating discharge to be initiated between the main or operating electrodes. Some difficulties have been encountered in starting such lamps after they have been in service for an extended period of time.

It is the general object of this invention to avoid and overcome the foregoing and other difficulties of and objections to prior art practices by the provision of a method for improving the operating characteristics of high-pressure mercury-vapor lamps.

It is a further object to provide a method for processing an arc tube for mercury vapor lamps in order to insure that the lamps will properly start during their rated life.

It is another object to provide a fabricated arc tube for a high-pressure, mercury-vapor lamp, which arc tube has been processed to insure that the starting characteristics of the lamp incorporating the arc tube will not be impaired during rated lamp life.

The foregoing objects of the invention, and other objects which will become apparent as the description proceeds, are achieved by providing a method for processing a fabricated arc tube wherein at least substantially all molybdenum trioxide is removed from at least those outer surfaces of the arc tube envelope which are proximate to and between those lead conductors which connect to the starting electrode and to that operating electrode which has the starting electrode positioned proximate thereto. Also provided is the fabricated arc tube which has been so processed.

For a better understanding of the invention, reference should be had to the accompanying drawings wherein:

FIG. 1 is an elevational view, partly in section, showing a fabricated arc tube;

FIG. 2 is an elevational view, partly in section, showing a completed high-pressure, mercury-vapor lamp incorporating an arc tube which has been processed in accordance with the present invention;

FIG. 3 is an elevational view, partly in section, showing an arc tube construction which is modified slightly from that shown in FIG. 1 and illustrating one embodiment of the present method.

With specific reference to the form of the invention illustrated in the drawings, the arc tube 10 as shown in FIG. 1 is of generally standard construction and comprises a sealed, elongated and radiation-transmitting envelope 12 which is fabricated of quartz. The envelope encloses an inert, ionizable starting gas such as argon at pressure of twenty-five mm. and a small charge of mercury 14. Main or operating electrodes 16 are operatively positioned within the envelope 12 and proximate each end thereof. A starting electrode 18 is positioned proximate one of the operating electrodes. In order to facilitate electrical connection to the electrodes 16 and 18, while still maintaining a hermetic seal through the arc tube envelope 12, conventional molybdenum ribbon conductors 20 are sealed through the ends of the envelope 12 by means of the quartz "presses" 22 formed at the extremities of the envelope 12. Electrically connecting to the ribbon conductors 20 and extending externally of the arc tube envelope 12 are separate molydenum wire electrical lead-in conductors 24. These lead-in conductors 24 and the ribbon conductors 20 are fabricated of molybdenum because of the high temperatures which these leads and ribbon conductors must withstand. Tungsten could be used in place of the molybdenum, but because of the expense and difficulties in working and handling tungsten, molybdenum is the best suited material.

The foregoing arc tube construction is conventional and as an example, for a 400 watt size, the spacing between the operating electrodes 16 is approximately seventy mm., the volume of the arc tube is approximately twenty cc. and approximately sixty-six milligrams of mercury are included within the arc tube. It should be understood that this specific example is subject to considerable variation with respect to construction and wattages and other starting gases can be substituted for the argon as specified.

In FIG. 2 is shown a lamp 26 which incorporates an arc tube 10 such as shown in FIG. 1. Briefly, this lamp comprises a radiation-transmitting outer envelope 28 having a conventional screw-type base 30 connected thereto. A phosphor coating 31 may be included on the inner surface of envelope 28. The arc tube 10 is supported within the outer envelope 28 by means of a conventional supporting frame 32. A starting resistor 34 connects the starting electrode 18 to one side of the energizing potential. All of the foregoing general lamp construction is conventional.

When forming the presses 22 about the ribbon conductors 20 as shown in FIG. 1, the ends of the envelope 12 are heated to a temperature of approximately 1750° C. in order to cause the quartz to soften. This causes considerable molybdenum trioxide to be formed on the surface of the lead-in conductors 24. The arc tube is later lehred and exhausted to remove residual traces of impurities and the lehring temperatures can be as high as 1000° C. Apparently during the pressing and later lehring operations, molybdenum as trioxide is deposited from the lead-in conductors 24 onto the outer surfaces of the arc tube envelope 12. It has been found that if this molybdenum trioxide is allowed to remain on those arc tube envelope outer surfaces which are proximate the envelope end enclosing the starting electrode 18, the lamps after an extended period of operation, but before rated life, display a tendency to become difficult to start. In some instances the lamps have become sufficiently difficult to start to require replacement and such lamps are classed as premature service failures. It has been found that these starting difficulties are due to the reduction of the deposited molybdenum trioxide to molybdenum metal, either because of the high temperatures or intense ultraviolet radiations generated by the arc tube discharge, or both. When such a film of molybdenum metal is ultimately formed on the outer surfaces of the arc tube envelope 12 so as to bridge the individual lead conductors 22 which connect to both the starting electrode 18 and the proximate operating electrode 16, the potential which should be developed across these proximate electrodes during starting is shorted out, thereby causing the lamps to fail prematurely.

In accordance with the present invention, at least substantially all molybdenum trioxide is removed from at least those outer surfaces of the fabricated arc tube envelope 12, as shown in FIG. 1, which are proximate to and between those lead conductors 24 which connect to the starting electrode 18 and to that operating electrode 16 which has the starting electrode positioned proximate thereto. The preferred method for removing this molybdenum trioxide is to immerse the foregoing envelope outer surface portions in a solution which is a solvent for molybdenum trioxide. These selected envelope surfaces are maintained in the solvent until at least substantially all molybdenum trioxide contacted by the solvent is dissolved. Thereafter the arc tube is removed from the solvent and any remaining solvent is removed from the outer surfaces of the arc tube. As a matter of practice, rather than dip only a selected portion of the fabricated arc tube into the solvent, it is convenient to immerse the entire arc tube 10 in the solvent. The preferred solvents for dissolving the film of molybdenum trioxide are basic solutions which will normally convert the molybdenum trioxide to molybdates. The best of such preferred solvents is an aqueous ammonium hydroxide solution, wherein the ammonium hydroxide concentration is ten percent by weight. As a specific example, the arc tube 10 is dipped into this ammonium hydroxide solution and allowed to remain for a period of one minute. Thereafter the arc tube 10 is removed from the solvent and is water rinsed to remove any residual ammonium hydroxide. After rinsing, the arc tube is dried and it may be heated slightly such as to 100° C. to facilitate drying. The foregoing concentration of the preferred ammonium hydroxide solvent solution is in no way critical and can be varied considerably. In addition, five percent by weight calcium hydroxide, caustic soda or caustic potash in aqueous solutions can be substituted for the preferred ammonium hydroxide. The solution concentrations are not critical.

The deposited molybdenum trioxide can be removed from the preselected portions of the outer surfaces of the arc tube by other than a dissolution procedure. In FIG. 3 is shown an arc tube construction 10a which is generally similar to the tube 10 as shown in FIG. 1 except that the "pressed portions" 22a have a considerably enlarged cross-sectional area. Also shown in FIG. 3 is an alternative method for removing the deposited molybdenum trioxide, wherein a flame 36 having sufficient intensity to vaporize a surface layer of molybdenum trioxide, but of insufficient intensity to soften quartz, is applied to those selected fabricated arc tube outer surfaces which are proximate to and between those lead conductors 24 which connect to the starting electrode 18 and to that operating electrode 16 which has the starting electrode positioned proximate thereto. The direction of this flame 36 is controlled by directing the nozzle 38 so that the majority of the heated gases resulting therefrom are directed away from the selected arc tube envelope surfaces in order that vaporized molybdenum trioxide will not redeposit upon the arc tube envelope surfaces. The flame exposure of the selected arc tube envelope surface portions is maintained for a sufficient period of time to vaporize at least substantially all heated molybdenum trioxide. As a specific example, the flame utilized is an oxygen-ethane (natural gas) mixture of such intensity that the flame-exposed arc tube surface portions are heated to a temperature of approximately 750° C. It has also been found that such a flame will tend to oxidize the surface portions of the lead conductors 24 which are heated, but because of the flame, this oxidation produces molybdenum dioxide which is quite stable. As a specific example, a heating period of thirty seconds with the foregoing flame as specified is sufficient to vaporize substantially all surface-deposited molybdenum trioxide which is so heated. The foregoing conditions are subject to considerable variation.

In control tests conducted with a large number of lamps in actual service, substantially no premature service failures were encountered due to so-called "hard starters," in contrast to lamps incorporating otherwise similar arc tubes which were not processed in accordance with the present invention.

It will be recognized that the objects of the invention have been achieved by providing a method for improving the operating characteristics of a high-pressure, mercury-vapor lamp as well as a method for processing the arc tube portion of such mercury-vapor lamps in order to insure that the lamps will properly start during their rated life. In addition, there has been provided a fabricated arc tube for a high-pressure, mercury-vapor lamp, which arc tube has been processed after fabrication in order to improve the starting characteristics of the lamp incorporating such an arc tube.

While best embodiments of the invention have been illustrated and described hereinbefore, it is to be particularly understood that the invention is not limited thereto or thereby.

I claim:

1. The method of improving the operating characteristics of a completed high-pressure mercury-vapor arc tube having, a sealed elongated and radiation-transmitting envelope enclosing an inert ionizable starting gas and a predetermined charge of mercury, operating electrodes positioned within said envelope proximate each end thereof, a starting electrode positioned proximate one of said operating electrodes, and separate molybdenum lead conductors having end portions of said envelope pressed thereon to form hermetic seals thereabout, and one of each of said lead conductors connecting to one of each of said operating electrodes and to said starting electrode, which method comprises, removing molybdenum trioxide from at least those outer surfaces of the arc tube envelope which are proximate to and between those lead conductors which connect to the starting electrode and to that operating electrode which has the starting electrode positioned proximate thereto.

2. The method of improving the operating characteristics of a completed high-pressure mercury-vapor arc tube having, a sealed elongated quartz envelope enclosing an inert ionizable starting gas and a predetermined charge of mercury, operating electrodes positioned within said envelope proximate each end thereof, a starting electrode positioned proximate one of said operating electrodes, and separate molybdenum lead conductors having end portions of said envelope pressed thereon to form hermetic seals thereabout, and one of each of said lead conductors connecting to one of each of said operating electrodes and to said starting electrode, which method comprises, immersing in a solution which is a solvent for molybdenum trioxide at least those fabricated arc tube outer surfaces which are proximate to and between those lead conductors which connect to the starting electrode and to that operating electrode which has the starting electrode positioned proximate thereto, and maintaining such immersed arc tube outer surfaces in said solvent until at least substantially all molybdenum trioxide on such immersed arc tube outer surfaces is dissolved.

3. The method of improving the operating characteristics of a completed high-pressure mercury-vapor arc tube having, a sealed elongated quartz envelope enclosing an inert ionizable starting gas and a predetermined charge of mercury, operating electrodes positioned within said envelope proximate each end thereof, a starting electrode positioned proximate one of said operating electrodes, and separate molybdenum lead conductors having end portions of said envelope pressed thereon to form hermetic seals thereabout, and one of each of said lead conductors connecting to one of each of said operating electrodes and to said starting electrode, which method comprises, immersing the fabricated arc tube in a solution which is a solvent for molybdenum trioxide, maintaining said fabricated arc tube in said solution until at least substantially all molybdenum trioxide on the outer arc tube surfaces is dissolved, removing said arc tube from said solvent, and thereafter removing remaining solvent solution from the outer surfaces of said arc tube.

4. The method as specified in claim 3, wherein remaining solvent solution is removed from the outer surfaces of the arc tube by means of a water rinse.

5. The method as specified in claim 3, wherein the molybdenum trioxide solvent solution is an aequeous caustic soda solution.

6. The method as specified in claim 3, wherein the molybdenum trioxide solvent solution is an aqueous ammonium hydroxide solution.

7. The method as specified in claim 6, wherein remaining solvent solution is removed from the outer surfaces of the arc tube by means of a water rinse.

8. The method of improving the operating characteristics of a completed high-pressure mercury-vapor arc tube having, a sealed elongated quartz envelope enclosing an inert ionizable starting gas and a predetermined charge of mercury, operating electrodes positioned within said envelope proximate each end thereof, a starting electrode positioned proximate one of said operating electrodes, and separate molybdenum lead conductors having end portions of said envelope pressed thereon to form hermetic seals thereabout, and one of each of said lead conductors connecting to one of each of said operating electrodes and to said starting electrode, which method comprises: exposing to a flame of sufficient intensity to vaporize a surface layer of molybdenum trioxide but of insufficient intensity to soften quartz, those selected fabricated arc tube outer surfaces which are proximate to and between those lead conductors which connect to the starting electrode and to that operating electrode which has the starting electrode positioned proximated thereto; controlling the direction of the flame so that the majority of the heated gases resulting therefrom are directed away from the arc tube surfaces; and maintaining the flame exposure of the selected arc tube surface portions for a sufficient period of time to vaporize at least substantially all molybdenum trioxide exposed to the heat of the flame.

9. A high-pressure mercury-vapor arc tube comprising a sealed elongated and radiation-transmitting envelope enclosing an insert ionizable starting gas and a predetermined charge of mercury, operating electrodes positioned within said envelope proximate each end thereof, a starting electrode positioned proximate one of said operating electrodes, and separate molybdenum lead conductors having end portions of said envelope pressed thereon to form hermetic seals thereabout, and one of each of said lead conductors connecting to one of each of said operating electrodes and to said starting electrode, said arc tube having been processed after fabrication by the method which comprises, removing molybdenum trioxide from at least those outer surfaces of the arc tube envelope which are proximate to and between those lead conductors which connect to the starting electrode and to that operating electrode which has the starting electrode positioned proximate thereto.

References Cited in the file of this patent

UNITED STATES PATENTS

| | | |
|---|---|---|
| 2,568,459 | Noel | Sept. 18, 1951 |
| 2,617,068 | Spinnler | Nov. 4, 1952 |
| 2,715,691 | Meister | Aug. 16, 1955 |
| 2,745,982 | Breadner | May 15, 1956 |